United States Patent
Itzhak et al.

(10) Patent No.: US 9,946,788 B2
(45) Date of Patent: Apr. 17, 2018

(54) SYSTEM AND METHOD FOR AUTOMATED MAPPING OF KEYWORDS AND KEY PHRASES TO DOCUMENTS

(75) Inventors: Ilan Itzhak, Jerusalem (IL); Yaron Galai, Rishon Lezion (IL); Oded Itzhak, Modi'in (IL)

(73) Assignee: Oath Inc., Dulles, VA (US)

( * ) Notice: Subject to any disclaimer, the term of this patent is extended or adjusted under 35 U.S.C. 154(b) by 1305 days.

(21) Appl. No.: 10/485,108

(22) PCT Filed: Jul. 22, 2003

(86) PCT No.: PCT/IL03/00598
§ 371 (c)(1),
(2), (4) Date: Feb. 3, 2004

(87) PCT Pub. No.: WO2004/010331
PCT Pub. Date: Jan. 29, 2004

(65) Prior Publication Data
US 2004/0181525 A1      Sep. 16, 2004

Related U.S. Application Data

(60) Provisional application No. 60/397,623, filed on Jul. 23, 2002.

(51) Int. Cl.
*G06F 17/30* (2006.01)

(52) U.S. Cl.
CPC .... *G06F 17/3069* (2013.01); *G06F 17/30864* (2013.01)

(58) Field of Classification Search
CPC ................. G06F 17/3069; G06F 17/30864
(Continued)

(56) References Cited

U.S. PATENT DOCUMENTS 5,796,952 A    8/1998  Davis et al.
5,835,087 A   11/1998  Herz
(Continued)

FOREIGN PATENT DOCUMENTS

EP    1024437 A    8/2000
EP    1030247      8/2000
(Continued)

OTHER PUBLICATIONS

International Search Report for Application No. PCT/IL02/00616, dated Sep. 12, 2007, 6 pages.
(Continued)

*Primary Examiner* — Grace Park
(74) *Attorney, Agent, or Firm* — Finnegan, Henderson, Farabow, Garrett & Dunner, L.L.P.

(57) ABSTRACT

A method for automated mapping of key terms to documents. Preferably a feature vector is generated for the key terms. Preferably such feature vectors are automatically generated by analyzing a corpus, but may optionally be generated manually, or using a combination of automated and manual processes. Next, preferably such feature vectors are weighted. Such weighting may optionally be performed manually, but more preferably is performed automatically. Next, a feature vector is optionally and preferably generated for the document, which preferably includes words and phrases that were extracted from the document but may optionally include words and phrases that do not appear in the document, such as synonyms and related. Each element in the document feature vector is preferably weighted. The feature vectors of the key terms and the feature vectors of the documents are compared, in order to produce relevancy scores, which are used to produce mapping between documents and key terms. This mapping may optionally be used
(Continued)

for a wide variety of applications, such as for targeted advertising for example.

32 Claims, 4 Drawing Sheets

(58) Field of Classification Search
USPC .................. 707/3–6, 728; 704/9; 706/8
See application file for complete search history.

(56) References Cited

U.S. PATENT DOCUMENTS

| | | | |
|---|---|---|---|
| 5,835,712 A | | 11/1998 | DuFresne |
| 5,870,559 A | | 2/1999 | Leshem et al. |
| 5,895,470 A | | 4/1999 | Pirolli et al. |
| 5,905,862 A | | 5/1999 | Hoekstra |
| 5,933,822 A | | 8/1999 | Braden-Harder et al. |
| 5,948,061 A | | 9/1999 | Merriman et al. |
| 5,958,008 A | | 9/1999 | Pogrebisky et al. |
| 5,983,237 A | | 11/1999 | Tain et al. |
| 5,987,457 A | | 11/1999 | Ballard |
| 6,035,332 A | | 3/2000 | Ingrassia, Jr. et al. |
| 6,044,376 A | * | 3/2000 | Kurtzman, II ............... 707/102 |
| 6,078,866 A | | 6/2000 | Buck et al. |
| 6,078,916 A | * | 6/2000 | Culliss ................................ 707/5 |
| 6,169,986 B1 | * | 1/2001 | Bowman et al. ................ 707/5 |
| 6,256,633 B1 | | 7/2001 | Dharap |
| 6,269,361 B1 | | 7/2001 | Davis et al. |
| 6,308,202 B1 | | 10/2001 | Cohn et al. |
| 6,356,899 B1 | | 3/2002 | Chakrabarti et al. |
| 6,366,298 B1 | | 4/2002 | Haitsuka et al. |
| 6,370,527 B1 | * | 4/2002 | Singhal ................................ 707/6 |
| 6,453,315 B1 | | 9/2002 | Weissman et al. |
| 6,523,026 B1 | * | 2/2003 | Gillis ................................ 707/3 |
| 6,526,440 B1 | | 2/2003 | Bharat |
| 6,668,256 B1 | | 12/2003 | Lynch |
| 6,704,727 B1 | | 3/2004 | Kravets |
| 6,754,873 B1 | | 6/2004 | Law et al. |
| 6,804,659 B1 | * | 10/2004 | Graham et al. ............. 705/14.49 |
| 6,816,857 B1 | * | 11/2004 | Weissman et al. .... 707/999.005 |
| 6,907,566 B1 | | 6/2005 | McElfresh et al. |
| 7,054,857 B2 | * | 5/2006 | Cunningham et al. ............. 707/3 |
| 7,174,346 B1 | | 2/2007 | Gharachorloo et al. |
| 7,231,399 B1 | | 6/2007 | Bem et al. |
| 7,249,121 B1 | | 7/2007 | Bharat et al. |
| 2002/0010625 A1 | | 1/2002 | Smith et al. |
| 2002/0022956 A1 | * | 2/2002 | Ukrainczyk et al. ............. 704/9 |
| 2002/0107735 A1 | | 8/2002 | Henkin et al. |
| 2002/0123912 A1 | | 9/2002 | Subramanian et al. |
| 2003/0009377 A1 | * | 1/2003 | Asami et al. ................... 705/14 |
| 2003/0078899 A1 | * | 4/2003 | Shanahan ........................ 706/8 |
| 2003/0088554 A1 | * | 5/2003 | Ryan et al. ..................... 707/3 |
| 2004/0059708 A1 | * | 3/2004 | Dean et al. ..................... 707/1 |
| 2004/0172389 A1 | | 9/2004 | Galai et al. |
| 2004/0177015 A1 | | 9/2004 | Galai et al. |
| 2005/0149499 A1 | | 7/2005 | Franz et al. |
| 2005/0267872 A1 | | 12/2005 | Galai et al. |

FOREIGN PATENT DOCUMENTS

| | | |
|---|---|---|
| WO | WO 00/67159 | 11/2000 |
| WO | WO 00/68839 | 11/2000 |
| WO | WO 00/75814 | 12/2000 |
| WO | WO 01/44992 | 6/2001 |
| WO | 0241557 A | 5/2002 |
| WO | WO 02/037220 | 5/2002 |
| WO | WO 03/012576 | 2/2003 |
| WO | WO 03/017023 | 2/2003 |
| WO | WO 04/010331 | 1/2004 |
| WO | WO 04/111771 | 12/2004 |
| WO | WO 05/119423 | 12/2005 |

OTHER PUBLICATIONS https://www.google.com/adsense/overview, "Unleash the full revenue potential of your website with Google Adsense", Jan. 14, 2004, 3 pages.
International Search Report for Application No. PCT/IL/02/00669, dated Jun. 11, 2003, 4 pages.
International Search Report for Application No. PCT/IL02/00616, dated Aug. 21, 2003, 4 pages.
International Search Report for Application No. PCT/IL03/00598, dated Nov. 5, 2003, 4 pages.
International Search Report for Application No. PCT/US05/018996, dated May 17, 2007, 3 pages.
Office Action dated Mar. 6, 2007 issued by USPTO in commonly-owned U.S. Pub. No. 2005/0267872, 11 pgs.
Search Report for commonly-owned European Patent Application No. 02755591.1, 5 pages.
Bharat K. et al.: "A technique for measuring the relative size and overlap of public Web search engines" Computer Networks and ISDN Systems, North Holland Publishing, Amsterdam, NL; vol. 30, No. 1-7, Apr. 1998, pp. 379-388.
Hirai J. et al.: "WebBase: a repository of Web pages" Computer Networks, Elsevier Science Publishers B.V., Amsterdam, NL; vol. 33, No. 1-6, Jun. 2000, pp. 277-293.
Rong, Zhao et al., Narrowing the Semantic Gap-Improved Text-Based Web Document Retrieval Using Visual Features, IEEE Transactions on Multimedia, IEEE Service Center, Piscataway, NJ, US., vol. 4, No. 2, Jun. 2002.
Supplementary European Search Report issued by the European Patent Office for EPO Application No. 03738477.3, dated Sep. 27, 2007 (3 Pages).

* cited by examiner

SYSTEM AND METHOD FOR AUTOMATED MAPPING OF KEYWORDS AND KEY PHRASES TO DOCUMENTS

RELATED PATENT APPLICATION

This application is National Phase Patent Application of PCT Application No. PCT/IL03/00598, filed on 22 Jul. 2003, which claims priority from U.S. Provisional Patent Application No. 60/397,623, filed 23 Jul. 2002.

FIELD OF THE INVENTION

The present invention relates to a system and a method for automated mapping of key terms to documents, and in particular, for such a system and method in which such key terms are capable of being used for many different applications related to keyword and key phrase extraction, discovery, searching and mapping.

BACKGROUND OF THE INVENTION

There are different kinds of search services that help the user find relevant Web pages on the Internet. Directories, like Yahoo, use human editorial teams to categorize websites they find into a categorical tree. In nature they are similar to telephone directories, where the user would look up a category such as Auto Repair.

Search engines, like Google, FAST, Inktomi or AltaVista, send their spiders out in an attempt to visit each and every page of each and every web site, and every bit of information they find is indexed. Their index consists of each and every word they extract from documents found by their spiders. A search query submitted by a user is compared against the index and a list of relevant search results in constructed.

A third type of search service enables website owners to manually insert key terms of their choice into the search index. In this type of service, operated for example by companies such as Overture and FindWhat, a search query submitted by a user is compared against an index that consists of a list of key terms. Usually (but not necessarily), a 'hard match' is required between the submitted search query to one of the keywords or key-phrases ("Key terms") in the index in order for the search service to provide the user with search results. Website owners that submit a Web page to such search service, have to find the Key terms that best fit the submitted Web page. For example, the terms 'Harry Potter' and 'book' could be submitted for a certain page within an online bookstore. Any time these terms are submitted to the search service by a user, the said Web page would probably appear within the search results (depending on the specific ranking algorithms used by the search service). Any other search query submitted by the user would not bring up the said Web page, even if those key terms appeared somewhere within the texts of that Web page. For example, the words 'Quidditch' may appear within the body of the text of the said Web page, but this keyword will never be matched by the search service to a user search query as long as the Web site owner does not submit it. The same holds true when a user submits a search query with a spelling mistake, a partial query (which consists of a substring of the indexed key terms), a query in which the words do not appear in the same order as is in the indexed key terms, etc. In all such cases (and assuming that no misspellings or other such variations were manually submitted to the index), the search service may not provide the user with search results to the submitted query.

One attempt to increase the utility of search engines, by providing an "intelligent" search for concepts related to the submitted query, is described in U.S. Pat. No. 6,453,315 to Applied Semantics Inc. This reference describes a method for mapping relationships between concepts, so that the closeness in "meaning" between a search query and searchable information is determined. Searchable information which is closest in "meaning" to the query may then be returned as the search result.

One significant drawback of such a method is that "meaning" is both relatively vague and also is not so easily determined, such that the determination of "closest in meaning" is also difficult to determine. The above-referenced patent attempts to determine "meaning" by defining a semantic space of similar or related concepts. These concepts must be predetermined in terms of their relationships and similarity to each other; the key terms can then be mapped to the concepts, for determining "closest in meaning". Target documents, such as Web pages for example, can then be assigned locations within the semantic space as part of preprocessing, before a search query is submitted. These locations relate to the score of the target documents for particular mapped concepts.

Although this method has the advantage of being capable of a mathematical implementation, and hence of being operated by a computer, it has many disadvantages. In particular, it requires predetermined relationships between concepts to be known before any processing of target documents is possible. In other words, the content of the actual documents must be subordinate to the previously determined conceptual map. Should the content fail to be well expressed or well determined by the conceptual map, then either the map must be redone or the search queries may fail to obtain the most relevant documents. Thus, the above-referenced patent fails to describe a method which may be flexibly adjusted according to the content of the documents.

Targeted advertising also is usually performed when Web site owners submit key terms to search engines as advertising platforms, which enable advertisers to use these platforms to buy traffic to Web sites that attract users who submitted search queries identical or very similar to the advertiser's submitted key terms. The most common business model is the pay-per-click through (PPC) model where the advertiser pays for click-throughs to his Web site. Hereinafter, the term "PPC search engine" refers to any type of search engine that compares a user search query against a list of pre-submitted key terms that are assigned to documents. For example, U.S. Pat. No. 6,269,361 describes a system for allowing a Web site owner to influence the position of their site link or information in search results presented to a user, by purchasing the position and/or paying money to positively influence the location of their web site in the search results.

As noted above with regard to the patent of Applied Semantics, targeted advertising can only be as accurate as the method of targeting. The method described in the patent is rigid, and may also fail when those who are determining the concept mapping do not understand cultural or other differences, for example when attempting to prepare such a map for different countries and/or languages. Thus, clearly an improved method for determining the "meaning" of Web pages and other documents would bring many benefits.

SUMMARY OF THE INVENTION

The background art does not teach or suggest a flexible method for determining the "meaning" of Web pages and other documents. The background art also does not teach or suggest a method which starts from the content of the Web pages and other documents, and then proceeds to determine relationships between the content of these different documents, and/or relationships between the Web pages and/or other documents and key words or key phrases.

The present invention overcomes these drawbacks of the background by providing a system and method for automated mapping of keywords and key phrases to documents. These keywords and key phrases (hereinafter termed "key terms") may optionally be derived from a number of different sources, including a list of "paid-for" (purchased, pre- or post-paid, or otherwise for which compensation is given) search terms that were submitted to a PPC search engine, a list of key terms that have been used (and/or submitted) as search queries, or a list of key terms that was compiled manually, or a list of key terms from any other source. The key terms may optionally and preferably comprise at least one key term provided by an advertiser or for an advertisement selection mechanism, as described in greater detail below. The key terms may also optionally and preferably be associated with additional information for characterizing each key term, including but not limited to, one or more of frequency, popularity or category.

The method of the present invention is optionally and preferably for automated mapping of items to documents. The items may optionally comprise any of a plurality of documents, a plurality of advertisements or a plurality of key terms. The method preferably includes analyzing a plurality of items to produce an item feature vector (the generation or determination of the feature vector is described below according to different exemplary embodiments). Next, an additional document may optionally be provided, which is then analyzed to produce a document feature vector. It should be noted that the word "additional" is not intended to imply that any of the items are necessarily a document, but rather is used for clarity as the items may optionally comprise a plurality of documents. Next, a relevancy of at least one of the items to the additional document according to the item feature vector and the document feature vector is preferably determined.

Optionally and preferably, the mapping process is performed in at least two parts. A pre-processing part is preferably performed first, preferably to generate a list of words (single or a plurality thereof) and phrases that are related to each key term (hereinafter termed "feature vector"). Preferably such feature vectors are automatically generated by analyzing a large collection of documents, hereinafter termed a "corpus", but may optionally be generated manually, or using a combination of automated and manual processes. It should be noted that throughout this specification, the term "document" may optionally refer to a Web page. Also, it should be noted that the generation of feature vectors is an exemplary but preferred embodiment for characterizing the corpus of documents; such characterization is important for the pre-processing part of the method according to the present invention.

Next, a second part of the mapping process is preferably performed for mapping key terms to a given document. This second part may optionally be performed in "real time", such that it is performed as soon as the subject document is received.

According to a preferred embodiment of the present invention, there is provided a method for creating the feature vector by optionally mapping key terms into a set of words and phrases that are related to the key term. The feature vector is therefore a preferred but non-limiting example of the characterization described above. Preferably such feature vectors are automatically generated from the corpus in the first part of the mapping process as described above, but may optionally be generated manually, and/or by using a combination of an automated process with manual intervention. Preferably each element in the feature vectors is weighted. Each element may optionally comprise one or more words. Such weighting may optionally be performed manually, but more preferably is performed automatically. Weighting is preferably performed when the feature vector is to be used for creating a distance measurement for comparison with the subject document in the second part of the mapping process as described above. Weighting is preferably performed according to a relevance of the element to a feature vector and/or item (from the plurality of items as previously described).

For automatic generation of feature vectors, optionally and preferably the following non-limiting, illustrative method is used. First a corpus is preferably determined. It should be noted that the method of the present invention preferably does not require the documents in the corpus to have any type of predetermined relationship, such that "collection" or "corpus" may optionally refer to any plurality of documents. Also, optionally more than one collection of documents could be determined.

Next, these documents (from one or more collections) are analyzed. This analysis may optionally include one or more procedures such as extracting features from the documents, determining the semantic relations between the features, detecting statistical patterns, indexing features or characteristics of the documents, clustering the documents, categorization of the features or characteristics and/or of the documents themselves, searching the documents and/or analyzing previous search queries or results, and ranking of the documents, for example according to some measure of relevancy. The feature vector of each key term is preferably generated using data generated in the corpus analysis process. The features may optionally comprise at least one word or phrase, such that the feature vector preferably comprises at least one element having at least one word or phrase obtained during the analysis process.

Optionally, the corpus may be used to determine one or more "themes", which express relationships between the documents. Alternatively, such themes may optionally be generated manually and/or from some other type of input. Optionally and more preferably, each theme is mapped to a weighted feature vector. More preferably, the feature vector of each theme is generated by analyzing specific (or at least a plurality of) documents from the corpus.

The above pre-processing stage of the key terms and the corpus optionally and preferably generates a feature vector for each key term (hereinafter termed "key term feature vector") based on the documents in the corpus, and optionally generates a list of themes, each with its own feature vector (hereinafter termed "theme feature vector"). Preferably, the key term feature vectors and the theme feature vectors include a weight for each element in the vector. Once this pre-processing is finalized, a mapping between a key term and any given document may optionally and preferably be determined.

Given a document for which key terms should be mapped, a feature vector is optionally and preferably generated for the document, which may optionally be termed a document feature vector. The document feature vector preferably includes words and phrases that were extracted from the document but may optionally include words and phrases that do not appear in the document, such as synonyms, related words etc. Each element in the feature vector is preferably weighted. Optionally and preferably, the theme feature vectors are then compared to the document feature vectors, which are then scored according to their relative similarity. Such scores may optionally be used for determining similarity of one or more themes to the document and/or otherwise mapping the theme to the document, for example by determining the distance between the feature vectors for a distance measurement. The similarity of one or more themes to the document may also optionally be used for determining similarity between the document and one or more other items, such as key terms for example. The theme itself may optionally be determined according to at least one feature vector, preferably for at least a portion of a collection of documents.

Alternatively, the key term feature vectors may be matched directly to the document feature vector(s) in order to determine the relationship between key terms and documents, for example according to similarity or lack thereof. Such matching is optionally and more preferably performed according to weighting of the elements in each feature vector, most preferably according to a distance measurement.

According to a preferred embodiment of the present invention, each element in a feature vector is optionally and preferably given a weight according to the relevance and uniqueness of the element to the feature vector. Weighting may also optionally be performed in terms of the relevance or importance of the element within the feature vector to a particular document, theme or key term.

Distance measurements may optionally be determined at least partially according to a weighting of elements in the various feature vectors, including but not limited to the item feature vector, the key term feature vector, the document feature vector, the theme feature vector and so forth.

Hereinafter, a "key term" includes any one or more of a single key word, multiple keywords and key phrases.

According to one embodiment of the present invention, there is provided a method for automatically mapping key terms to a document, optionally and preferably according to a comparison of feature vectors as described above. The key terms and the documents are optionally and more preferably submitted to a PPC ("pay per click through") search engine. The PPC ("pay per click through") search engine is a non-limiting example of an advertisement selection mechanism.

As described above, such a search engine compares a search query from a user to a list of a plurality of key terms for which payment has been made and/or will be made by an advertiser according to whether the user selects the link of that advertiser.

Given a set of documents, the present invention preferably includes a process that preferably generates relevant key terms per such document, more preferably according to the previously described feature vectors.

This process preferably receives as an input a set of documents and a list of key terms. The key terms may optionally be obtained from actual search queries previously submitted by users, or a list of purchased key terms from a PPC engine. The key terms are then mapped to the document. The mapping is based on the relevance of all or some of the key terms to the compared document.

At the end of the process, the list of documents, each with a list of key terms that were mapped to each document, are optionally submitted to a PPC engine.

The list of key terms is optionally and more preferably supplied by the PPC search engines, and may optionally and more preferably include actual queries that were processed by the PPC search engine or a list of purchased key terms.

The mapping may optionally and more preferably be limited to specific portions of the documents, such as title, part of the description such as product description etc.

According to another embodiment of the present invention, there is provided a method for automatically mapping key terms to a document for displaying contextually relevant key term-based advertisement. Each key term is optionally and more preferably assigned to one or more advertisements, which may optionally and preferably feature a textual title and/or description. An advertisement may also optionally be associated with at least one key word. When key terms are mapped to a document, advertisements that are assigned to one or more key terms are added to the document, and/or otherwise displayed to the user viewing and/or requesting the document. A document feature vector for the document may also (alternatively or additionally) be mapped to at least one of the title and the description for the advertisement. This optional embodiment allows advertisers to display their advertisements to users in a targeted manner.

It should be noted that a feature vector may optionally comprise a single element; for a key term, the feature vector may optionally comprise only the key term itself (alone or as one of a plurality of elements). Alternatively, the feature vector may optionally comprise a single element that is not the key term.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1A:
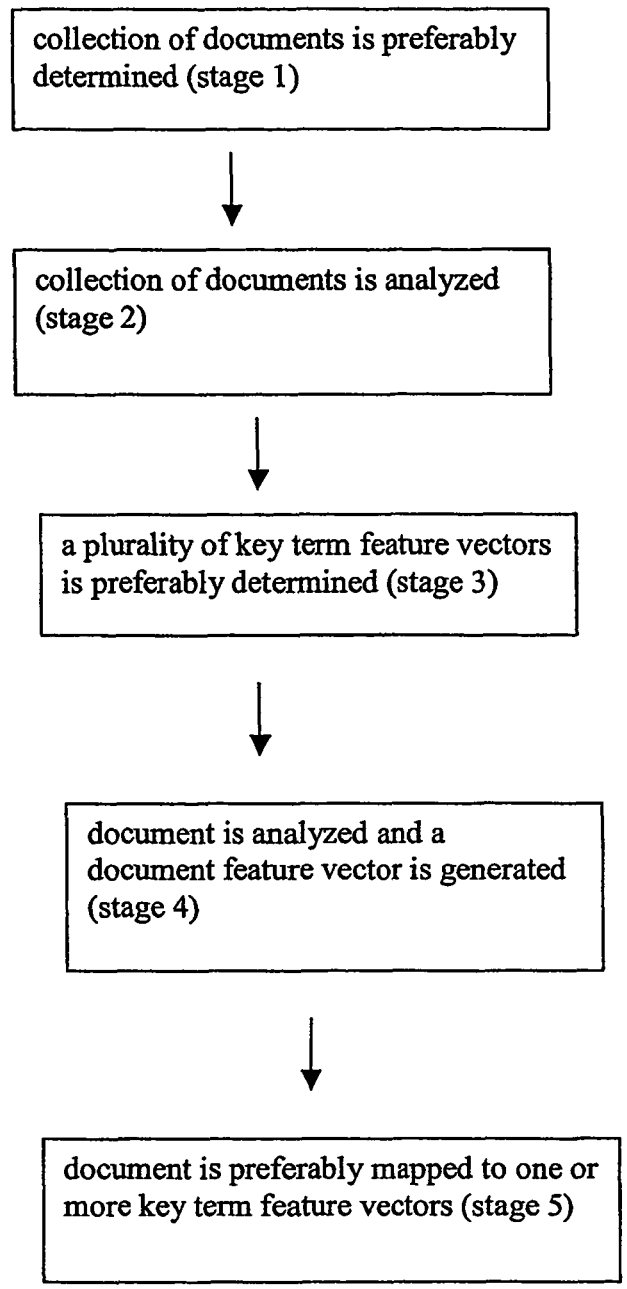
FIGS. 1A and 1B are flowcharts of exemplary methods according to the present invention.

The present invention is of a system and method for automated mapping of keywords and key phrases to documents. These keywords and key phrases (hereinafter termed "key terms") may optionally be derived from a number of different sources, including a list of purchased search terms (optionally and preferably submitted to a PPC search engine), a list of key terms that have been used as search queries, or a list of key terms that was compiled manually, and/or a list of key terms from any other source, or a combination thereof.

Optionally and preferably, the mapping process is performed in at least two parts. A pre-processing part is preferably performed first, preferably to generate a list of words and phrases that are related to each key term (hereinafter termed "feature vector"). Preferably such feature vectors are automatically generated by analyzing a large collection of documents, hereinafter termed a "corpus", but may optionally be generated manually, or using a combination of automated and manual processes. It should be noted that throughout this specification, the term "document" may optionally refer to a Web page, such that optionally the collection of documents may optionally be derived from the Web and/or may optionally be a collection of Web pages.

Next, a second part of the mapping process is preferably performed for mapping key terms to any given document. This second part may optionally be performed in "real time", such that it is performed as soon as the subject document is received.

The mapping between the key terms and the document can optionally be performed based on the actual existence of some or all words from the key term in the document, but can also be based on the similarity, contextual or otherwise, between one or more words from the key terms, and words in the document.

According to a preferred embodiment of the present invention, there is provided a method for mapping key terms into a set of words and phrases that are related to the key term, hereinafter termed a "feature vector". The feature vector is therefore a preferred but non-limiting example of the characterization described above. Preferably such feature vectors are automatically generated from the corpus in the first part of the mapping process as described above, but may optionally be generated manually, and/or by using a combination of an automated process with manual intervention. Preferably each element in the feature vectors is weighted. Such weighting may optionally be performed manually, but more preferably is performed automatically.

For automatic generation of feature vectors, optionally and preferably the following non-limiting, illustrative method is used. A corpus, or collection of documents, is preferably determined. It should be noted that the method of the present invention preferably does not require these documents to have any type of predetermined relationship. Optionally, however, the documents may be related, for example according to language (language specific), and/or may be associated with a category.

Next, these documents are analyzed. This analysis may optionally include one or more procedures such as extracting features from the documents, determining the semantic relations between the features, detecting statistical patterns, indexing features or characteristics of the documents, clustering the documents, categorization of the features or characteristics and/or of the documents themselves, searching the documents and/or analyzing previous search queries or results, and ranking of the documents, for example according to some measure of relevancy. The document may optionally and preferably be associated with additional information for characterizing the document, including but not limited to, one or more of category, related documents, or related keywords. The document may optionally be in the XML or HTML formats, and/or any other format.

The feature vector of each key term is preferably generated using data generated in the corpus analysis process.

The key terms and their feature vectors are then optionally and more preferably indexed, to enable fast retrieval during the document mapping process.

Optionally, the feature vectors may then be used to determine one or more "themes", which express relationships between the documents. Alternatively, such themes may optionally be determined without the feature vectors. More preferably, each theme has at least one associated theme feature vector.

Optionally and preferably, the theme feature vectors are then compared to the document feature vectors, which are then scored according to their relative similarity. Such scores may optionally be used for determining similarity of one or more themes to the document, for example by determining the distance between the feature vectors. Alternatively, the key term feature vectors may be matched directly to the document feature vector(s) in order to determine the relationship between key terms and documents, for example according to similarity or lack thereof. Such matching is optionally and more preferably performed according to weighting of the elements in each feature vector, most preferably according to a distance measurement.

According to a preferred embodiment of the present invention, each element in a feature vector is optionally and preferably given a weight according to the relevance and uniqueness of the element to the feature vector. Weighting may also optionally be performed in terms of the relevance or importance of the element within the feature vector to a particular document, theme or key term.

According to one embodiment of the present invention, there is provided a method for automatically mapping key terms to a document, optionally and preferably according to a comparison of feature vectors as described above. The key terms and the documents are optionally and more preferably submitted to a PPC ("pay per click through") search engine. As described above, such a search engine compares a search query from a user to a list of a plurality of key terms for which payment has been made and/or will be made by an advertiser according to whether the user selects the link of that advertiser.

Given a set of documents, the present invention preferably includes a process that preferably generates relevant key terms per such document, more preferably according to the previously described feature vectors.

This process preferably receives as an input a set of documents and a list of key terms. The key terms may optionally be obtained from actual search queries previously submitted by users, 'or a list of purchased ' key terms from a PPC engine. The key terms are then mapped to the document. The mapping is based on the relevance of all or some of the key terms to the compared document.

At the end of the process, the list of documents and/or the URLs of the documents, each with a list of key terms that were mapped to it, is optionally submitted to a PPC engine.

The list of key terms is optionally and more preferably supplied by the PPC search engines, and may optionally and more preferably include actual queries that were processed by the PPC search engine or a list of purchased key terms.

The mapping may optionally and more preferably be limited to specific portions of the documents, such as title, part of the description such as product description etc.

According to another embodiment of the present invention, there is provided a method for automatically mapping key terms to a document for displaying contextually relevant key term-based advertisement. Each key term is optionally and more preferably assigned to one or more advertisements, which may optionally and preferably feature a title and description. When key terms are mapped to a document, advertisements that are assigned to one or more key terms are added to the document, and/or otherwise displayed to the user viewing and/or requesting the document. This optional embodiment allows advertisers to display their advertisements to users in a targeted manner.

The principles and operation of the method according to the present invention may be better understood with reference to the drawings and the accompanying description. It should be noted that the present invention is operable with any type of document, although the present invention is explained in greater detail below with regard to Web pages for the purposes of illustration only and without any intention of being limiting.

Figure 1B:
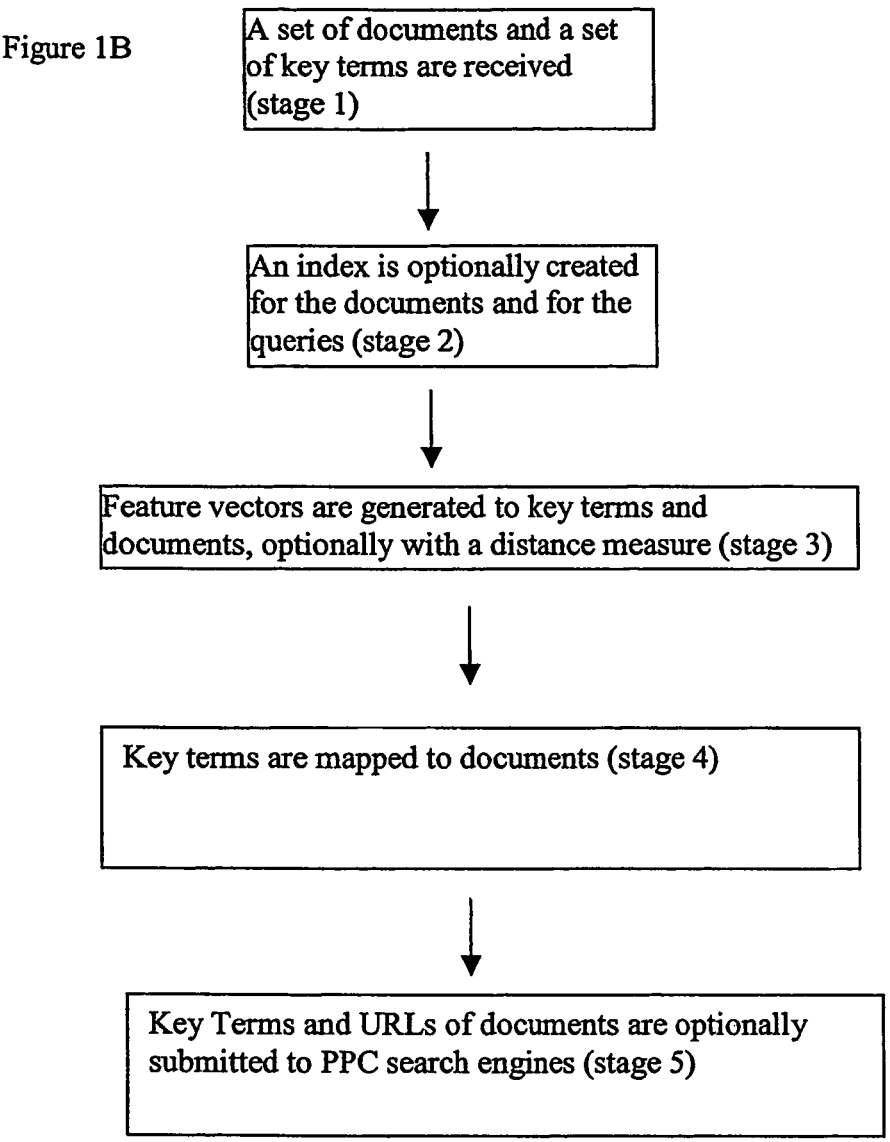

Referring now to the drawings, FIGS. 1A and 1B show different optional but preferred methods according to the present invention for mapping key terms to searchable documents.

FIG. 1A shows a first exemplary method according to the present invention for mapping key terms to documents, by determining a feature vector with a plurality of key terms. The feature vector can then optionally be used for matching the key terms to the most relevant document(s) by content for submission to a PPC engine, and/or for other applications such as targeted advertising, as described in greater detail below.

As shown in stage 1, a corpus or collection of documents is preferably determined. The documents may optionally be selected according to their relationship with each other (for example, by all being drawn to a particular subject), and/or because they are written in a common language, for example. Alternatively, the documents may not have any predetermined relationship. It should be noted that alternatively and optionally, a plurality of collections of documents may be determined.

In stage 2, the collection of documents is preferably analyzed to form a processed collection. Analysis optionally and preferably includes determining a frequency of words and/or phrases in the documents. Analysis may optionally include determining a plurality of different themes, for example according to the corpus, and/or providing a plurality of such themes. Again, it should be noted that alternatively and optionally, a plurality of collections of documents may be analyzed.

In stage 3, a list of key terms is determined, and a feature vector is preferably generated for each of the key terms. Each feature vector preferably comprises a plurality of elements, such as a plurality of words and phrases, which are more preferably weighted, preferably according to their relevancy to the key term. As previously described, the feature vectors may optionally and preferably be determined from the corpus itself, optionally manually but more preferably at least semi-automatically. Alternatively, feature vectors may be previously provided. An optional and preferable combination may include providing a plurality of feature vectors in advance, but then weighting the elements in the feature vectors according to the analysis of the corpus of documents.

Optionally, the list of key terms may be provided from a variety of different sources, including but not limited to, a list of purchased key terms (optionally and preferably submitted to a PPC search engine), a list of key terms that have been used as search queries, or a list of key terms that was compiled manually, and/or a list of key terms from any other source, or a combination thereof.

In stage 4, at least one document is optionally and preferably analyzed and a feature vector is generated for the at least one document. The document feature vector preferably includes words and phrases that were extracted from the document but may optionally include words and phrases that do not appear in the document, such as synonyms, related words etc. Each element in the feature vector is preferably weighted. According to preferred embodiments of the present invention, stages 1-3 are preferably performed "off-line" or for "pre-processing", while at least a portion of the remaining stages is optionally performed "in real time", for example upon receiving the at least one document. The document may optionally be requested by a user, for example by having the user request the URL for a Web page through a Web browser. The document may optionally and preferably be analyzed according to the analysis process described above for the corpus of documents, and/or according to a different process. For example, if the document is a structured document having a structure that is at least partially known, the analysis process for this stage may optionally use this information for increasing the efficiency and/or accuracy of this analysis stage.

In stage 5, the analyzed document is preferably compared to the feature vectors of the key terms in order to determine the relevancy of one or more key term feature vectors. For example, this stage may optionally result in mapping of the document to one or more key term feature vectors, preferably through comparison of the document feature vector and the key term feature vectors, after which a relevancy score is more preferably obtained for the mapping of each document feature vector to one or more key-term feature vectors, or alternatively or additionally to one or more theme feature vectors.

This relevancy factor is then optionally and preferably used to select one or more additional items as being relevant. For example, according to a non-limiting embodiment of the present invention, the additional item may optionally be an advertisement, which would then preferably be displayed to the user who requested the additional document. For example, the advertisement could optionally be displayed in combination with a requested Web page, and/or on top of such a Web page ("pop-over" advertisement) or under such a Web page ("pop-under" advertisement). Therefore, the advertisement could preferably be targeted to the request of the user, and thus presumably to the interest(s) of the user.

This optional but preferred embodiment of the present invention may further be performed in conjunction with purchase of one or more key terms by an advertiser. As a non-limiting, illustrative example, the advertiser may sell automobiles, and therefore may optionally purchase a certain number of clicks on or through an advertisement after a requested document was found to be related to the key term "car", for example. This implementation is preferably performed with a "PPC" (pay per click through) search engine, which sells advertisements according to key terms.

A second embodiment of the present invention is shown with regard to FIG. 1B. As for FIG. 1A in stage 1, a set of documents is received. However, a set of a plurality of key terms is also preferably received, which preferably is derived from a list of actual search queries submitted by users to a search engine. More preferably, the set of queries also include frequency information, as to the frequency or rate at which the queries were submitted. Stage 1 may also optionally be performed by having a page retrieval module crawl a target Web site and retrieve pages.

In stage 2, an index is optionally and preferably created for the documents and/or key terms.

A plurality of feature vectors is preferably created for the documents and optionally for the key terms (stage 3), optionally and more preferably with a distance measure, as described above. The key terms are then mapped to the documents, preferably according to the feature vectors as described above (stage 4).

The key terms and their associated URLs of documents are optionally submitted to PPC search engines in stage 5.

Figure 2:
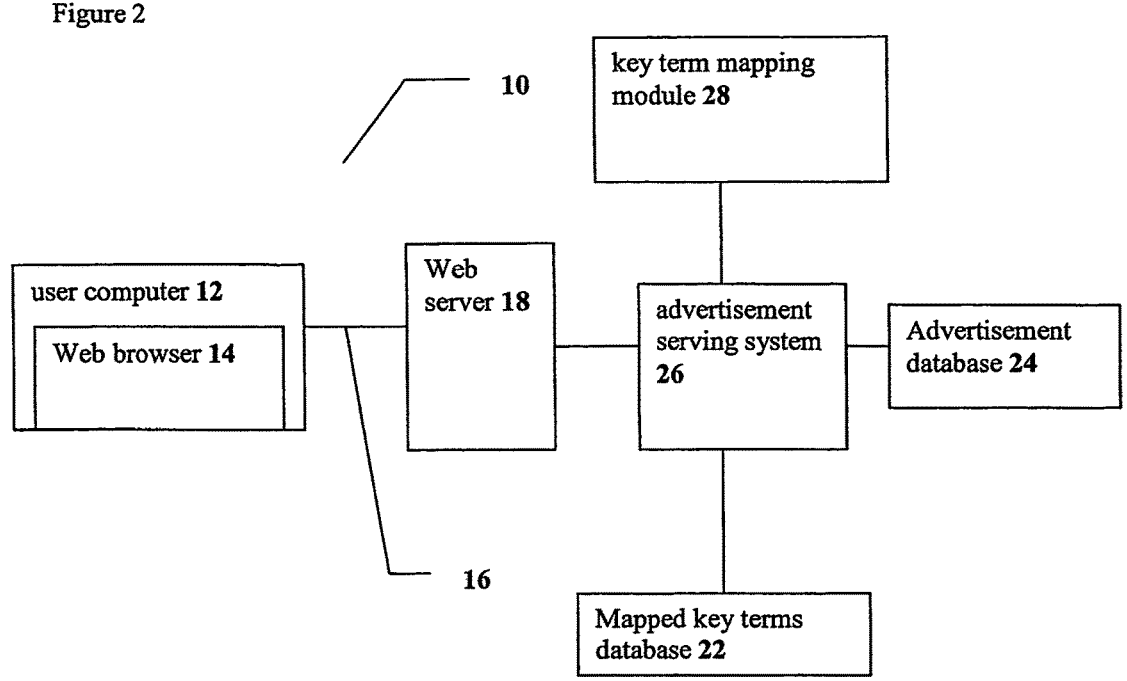
FIG. 2 shows an exemplary system according to the present invention.

FIG. 2 shows an exemplary system according to another embodiment of the present invention, which is related to targeted advertising. As shown in system 10, a user computer 12 preferably operates a Web browser 14 or any other type of document viewer. User computer 12 is preferably connected to a network 16, such as the Internet for example, although alternatively network 16 could optionally comprise a LAN (local area network), a WAN (wide area network), and/or any combination of multiple networks (which could also optionally include the Internet). Through network 16, user computer 12 is preferably able to access Web pages and/or other documents being served by a Web server 18.

When a request for a page identified by a URL is received by Web server 18, Web Server 18 optionally and preferably submits the requested URL to an advertisement serving system 26 (which may optionally be any type of server, also, advertisement serving system 26 may also optionally comprise a server for performing an analysis according to key terms and an advertising server). Alternatively, advertisement serving system 26 can receive the URL directly from Web browser 14.

Advertisement serving system 26 preferably parses the URL, and optionally additionally or alternatively parses the content in the document matching the URL and/or other types of information submitted by the user. Additionally, the query may be a request using key terms for a search. For the former type of query, advertisement serving system 26 preferably examines the requested Web page and/or the URL itself (which may also contain information as terms in the URL) in order to obtain a plurality of key terms. If the document has already been previously examined, then preferably advertisement serving system 26 may retrieve the key terms from a mapped key terms database 22. If the document has not been previously examined, then content extracted from the document and/or the full document and/or the URL of the document are submitted to key term mapping module 28, which maps a plurality of search terms to the documents, and optionally stores the mapping in mapped key terms database 22. These key terms may optionally be used directly by advertisement serving system 26 to select an advertisement from an advertisement database 24. Again, as previously described, although this description centers around advertisements, the present invention could also optionally be used for selecting other types of additional item(s). Advertisement serving system 26 then preferably communicates with advertisement database 24 to select one or more advertisements. In any case, advertisement serving system 26 preferably provides the results in the form of an XML page, if requested by Web server 18, or in the form of HTML page if requested by a Web browser such as Web browser 14.

It should be noted that the structure of system 10 may optionally be varied. For example, user computer 12 may optionally communicate directly with advertisement serving system 26, which may also optionally communicate directly with advertisement database 24. However, preferably user computer 12 communicates with advertisement serving system 26, and/or with Web server 18 directly. Advertisement serving system 26 optionally and preferably handles all communication with key term mapping module 28 and with advertisement database 24.

According to other preferred embodiments of the present invention, advertisement serving system 26 and/or key term mapping module 28 are preferably capable of automatically identifying Web pages with undesirable content (from the perspective of an advertiser), such as pornography, terrorism, hate, crimes, and so forth, and/or other types of themes and may then optionally indicate the relevancy of the page content to these themes in the response provided, for example in the XML page. This information can optionally be used by advertisement serving system 26 and/or key term mapping module 28 and/or advertisement database 24 in order to block advertisements from appearing on those Web pages in the case of undesirable and/or unsuitable content, and/or for other purposes.

According to another optional embodiment of the present invention, any two or more of Web server 18, advertisement serving system 26, advertisement database 24, mapped key terms database 22 and/or key term mapping module 28 can be combined in a single entity.

According to another optional but preferred embodiment of the present invention, either advertisement serving system 26, advertisement database 24 or key term mapping module 28, or a combination thereof, comprises an advertisement formatting module (not shown), which is capable of automated conversion of text ads to banner display advertisements such as banner "gifs", more preferably according to any one of a plurality of banner sizes.

Optionally and more preferably, either key term mapping module 28 and/or advertisement serving system 26 is optionally and preferably capable of performing a relevancy algorithm by examining the relevancy of an advertisement to the submitted URL (and/or to the submitted query and/or other information), more preferably according to associated information about the advertisement. Such associated information preferably includes a title and/or description of the advertisement. This optional but preferred additional feature provides a significant improvement in advertisement relevancy in cases where key terms may have multiple meanings.

Also optionally and preferably, during the set-up process for a new publisher, the publisher's Web site is crawled, and relevant key terms are mapped from an existing collection to each URL that is detected during the crawling process. The mapping is then loaded into mapped key terms database 22.

Each time a request for an advertisement and/or key terms arrives at advertisement serving system 26 and/or key term mapping module 28, a response is preferably generated as follows. If the normalized form of the URL exists in mapped key terms database 22, an XML document (or other type of message) with the corresponding keywords and their scores is preferably generated and sent back.

If the URL is not in the cache or has expired, the URL is preferably queued for processing, and a response indicating that the URL is being processed is preferably sent back. In this case, the URL may optionally be sent to key term mapping module 28 for processing, preferably after sending all pending URLs with a higher priority that are queued on advertisement serving system 26 and/or key term mapping module 28.

According to an optional and preferred embodiments of the present invention, the set-up process for enabling advertisement serving system 26 and/or key term mapping module 28 to be able to map key terms to portions of the information of the Web page in order to improve relevancy is preferably performed as follows. Using advanced machine-learning algorithms, key term mapping module 28 extracts specific portions of each web page and gives them appropriate weights.

System 10 optionally and preferably includes a module (not shown) that monitors the Web site on an ongoing basis to alert when the site structure and/or the URL structure and/or the content on the processed web pages has changed.

For the optional but preferred embodiment in which advertisement serving system 26 is operative with a plurality of publishers (such as a plurality of Web servers 18 for example), advertisement serving system 26 preferably assigns an identifier for each publisher or advertisement network. This identifier is preferably passed in the request string in each query.

During the setup process, the publisher may optionally adjust the algorithm parameters to impact one or more of the following characteristics: maximize relevancy of listings vs. sold inventory; set the balance between relevancy maximization and profit maximization, for example by adjusting the cost per click or other cost measure for an advertisement, against the relevancy of that advertisement to the submitted information, such as a URL for example; and disable advertisement serving on Web pages with undesirable content such as pornographic materials.

According to still another optional but preferred embodiment of the present invention, although advertisement serving system 26 and key term mapping module 28 may optionally be comprised as a combined entity, this combined entity may actually feature a plurality of servers (not shown). For this optional embodiment, advertisement serving system 26 comprises a plurality of servers (which may optionally be a plurality of computers and/or a plurality of threads or processes), while key term mapping module 28 comprises a plurality of servers (which may also optionally be a plurality of computers and/or a plurality of threads or processes). A management server (also not shown) preferably handles the interaction between the two groups of servers.

Advertisement serving system 26 preferably handle requests from external servers (including but not limited to Web servers, publishers or search engines), and preferably serve advertisements or key terms, optionally and more preferably in a form of an XML document.

Key term mapping module 28 servers are preferably responsible for generating or mapping relevant key terms for URLs and/or documents.

The management server preferably dispatches keyword generation requests for URLs to key term mapping module 28 servers and also preferably dispatches the newly generated keywords to advertisement serving system 26 servers.

Communication between all servers is preferably performed according to the HTTP protocol, optionally allowing the distribution of the servers in different geographic locations secured behind firewalls.

In any case, examples of the types of messages passed according to the operation of system 10 are given below. Request for a cached URL will preferably result in an XML document with the following DTD:

```
<!-- Quigo AdSonar v1.0 Keywords Response DTD -->
<!ELEMENT QUIGO_RESULTS (URL, KEYWORDS, THEMES)>
<!ATTLIST QUIGO_RESULTS status CDATA #REQUIRED>
<!ELEMENT URL (#PCDATA)>
<!ELEMENT KEYWORDS (KEYWORD+)>
<!ATTLIST KEYWORDS
   total CDATA #REQUIRED
   threshold CDATA #REQUIRED
   date_generated CDATA #REQUIRED
>
<!ELEMENT KEYWORD (#PCDATA)>
<!ATTLIST KEYWORD score CDATA #REQUIRED>
<!ELEMENT THEMES (THEME+)>
<!ELEMENT THEME (#PCDATA)>
<!ATTLIST THEME score CDATA #REQUIRED>
```

Example of a server response:

```
<?xml version="1.0" encoding="UTF-8" ?>
<QUIGO_RESULTS status="READY">
   <URL><! [CDATA[ http://www.quigo.com ]]></URL>
   <KEYWORDS total="5" threshold="50" date_generated=
   "mm/dd/yyyy" >
      <KEYWORD score = "94.6"><! [CDATA[ search engine paid
      inclusions ]]></KEYWORD>
      <KEYWORD score = "82.1"><! [CDATA[ search engine
      marketing campaign ]]></KEYWORD>
      <KEYWORD score = "81.6"><! [CDATA[ search engine
      campaign]]></KEYWORD>
      <KEYWORD score = "80.9"><! [CDATA[ search engine
      marketing service]]></KEYWORD>
   </KEYWORDS>
   <THEMES >
      <THEME score = "64.6"><! [CDATA[ war ]]></THEME>
      <THEME score = "55.3"><! [CDATA[ crime ]]></THEME>
      <THEME score = "47.2"><! [CDATA[ tragedy ]]></THEME>
   </THEMES>
</QUIGO_RESULTS>
```

The "Themes" element preferably includes a list of themes and their scores, and may be used by the publisher or by the search engines to disable ads on specific themes. This list of themes should preferably be provided to key term mapping module 28 by the publisher or by the search engine beforehand. These themes are discussed above.

Request for a URL that is not yet cached will result in an XML that indicates that the requested URL is being processed. Example of an XML response indicating that the requested URL is being processed:

```
<?xml version="1.0" encoding="UTF-8" ?>
<QUIGO_RESULTS status="PROCESSED">
   <URL><! [CDATA[ http://www.quigo.com ]]></URL>
</QUIGO_RESULTS>
```

Figure 3:
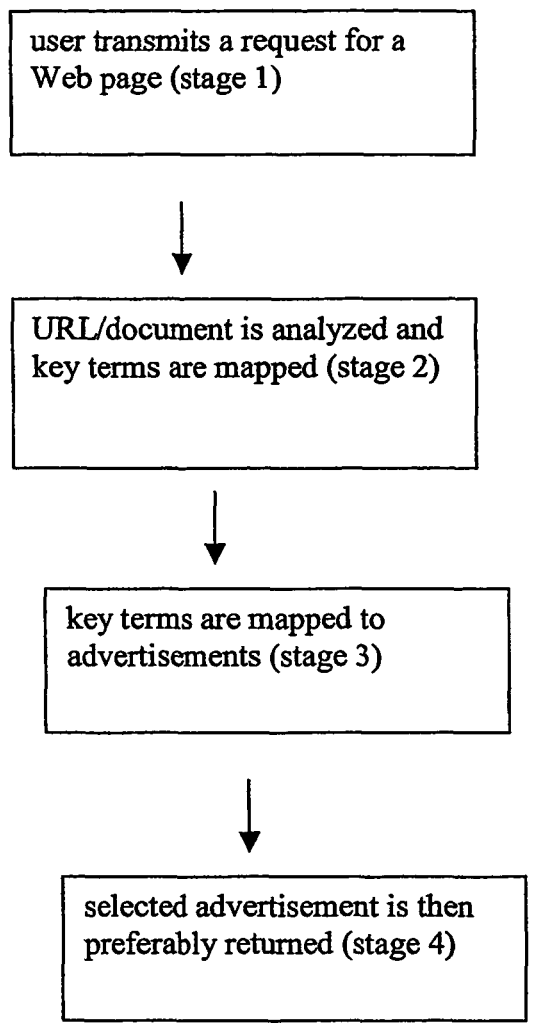
FIG. 3 shows a flowchart of an exemplary method for targeted advertising according to the present invention.

FIG. 3 shows an exemplary method according to the present invention for one such application of the present invention, which is related to targeted advertising. For this method, preferably one or both of the methods of FIGS. 1A and 1B are performed.

As shown in stage 1, a user transmits a request for a Web page. In stage 2, the Web page corresponding to the URL is preferably matched to the list of relevant key terms as previously described, more preferably by matching according to the key term feature vectors and feature vector for the Web page.

In stage 3, the key terms are preferably matched to at least one suitable advertisement, if not a plurality of advertisements. In stage 4, the selected advertisement is then preferably returned, for example for display with the Web page.

According to other exemplary but preferred embodiments of the present invention, there is provided a number of tools for assisting in the implementation of the present invention. These tools may optionally be provided as a suite of editorial applications. For example, one such application preferably enables an operator to specify new target sites and define the sections and pages that are to be retrieved by an advertisement serving system and/or key term mapping server. For example, in an e-commerce site, the editor may optionally specify that all product pages from only the book section should be retrieved.

Another application preferably enables field extraction definitions to be provided. For each target website, an editor preferably assists a short machine-learning process in which specific fields within the pages are tagged for extraction. For example, in a book site, the editor may choose to extract fields like book title, author, price, ISBN, description, availability, etc. The present invention preferably uses advanced machine learning algorithms to automatically extract specific pieces of information from Web pages, and to aggregate and restructure the information into XML documents. This process is optionally and preferably used to converted unstructured information to a structured document, according to which XML is one example of a type of document structure. This process may also optionally be used to discard non-relevant information, such as the copyright notice on a Web page, which is not directly relevant to the content of the Web page in order to improve relevancy of mapped search terms.

Another application preferably enables query terms to be discovered and to be associated with each URL, according to relevance with regard to the subject matter of each document. It also enables automatic assignment of more generic key terms to category-level pages, home page or to internal search result pages.

The present invention also optionally and preferably includes a method for generating key terms for marketing to advertisers. For example, advertisers may optionally generate a key term for purchasing displays of advertisements and/or clicks to advertisements, as previously described, by determining key term(s) that are relevant to the content of Web sites and/or other types of documents of the advertiser. For mapping to documents, the key terms may be described as "features" as stated above. For example, the key terms may optionally be mapped to a document through analysis of the document, such as for detecting the presence of one or more instances of the key term (or similar terms or terms having a similar or analogous meaning) in the document, and for then optionally performing some type of analysis (such as a statistical analysis for example) to determine whether the key term may optionally be relevant. Themes and/or feature vectors related to themes may also optionally be used. The advertiser may then optionally submit such key terms to a PPC or other type of search engine and/or advertisement display mechanism, such that when a relevant document is selected by the user, the advertisement is preferably displayed.

According to a preferred embodiment of the present invention, method for generating at least one search term for a Web page, comprising: generating a key term feature vector for at least one key term; analyzing the Web page to generate a Web page feature vector; and comparing said key term feature vector to said Web page feature vector to determine whether said at least one key term is a relevant search term. Optionally and preferably, the at least one generated search term is suitable for at least one of submission to a search engine or for being added to a meta tags section of the Web page (in the HTML format for example).

The present invention also optionally and preferably provides a taxonomy editor, which allows operators to create global taxonomies to which elements extracted from the HTML pages are mapped. During the extraction process, the operator preferably assigns Web pages to a taxonomy node (a topic) and maps the page elements to fields derived from the taxonomy node. For example, by mapping a book page to the taxonomy node "books", the operator is presented with a list of related fields such as "book title", "author", "ISBN", "description" etc. The operator then tags each element on the page with its corresponding field name. The XML generated by the field extraction process also preferably uses the taxonomy field names as the XML elements and attributes.

Another optional implementation of such an editor is for classification of documents according to mapped key terms (and/or feature vectors). The key terms, and preferably the feature vectors, are preferably mapped to a list of categories and/or themes. Document(s) may then preferably be mapped to the key terms and/or feature vectors, for categorization.

Still another optional embodiment of the present invention is for checking the relevancy of submitted key terms (submitted by advertisers, for example) to the content of an advertisement and/or other item. Currently, an advertiser may submit a key term, but the operator of a PPC search engine and/or other advertisement selection mechanism then typically determines whether the key term is actually relevant to the advertisement and/or other item that the advertiser has associated with the key term. This process prevents advertisers from purchasing popular but non-relevant key terms. The method of the present invention may optionally be used to automate this process, by mapping submitted key terms to feature vectors and automatically checking the relevancy of this feature vector to the feature vector of the submitted document. This process optionally and more preferably checks the relevancy of the submitted titles and descriptions as well as the key terms to the documents.

While the invention has been described with respect to a limited number of embodiments, it will be appreciated that many variations, modifications and other applications of the invention may be made.

What is claimed is:

1. A system for selecting an advertisement for display with a web page requested by a user through a web browser, the system comprising:
    at least one server, in communication with said web browser, configured to:
        receive, as input, a plurality of documents and a plurality of key terms;
        analyze content of the plurality of documents;
        automatically generate a key term feature vector for each key term based on the content of the plurality of documents, each key term feature vector comprising elements comprising a plurality of words or phrases that are related to the corresponding key term;
        analyze at least one of a Universal Resource Locator ("URL") of said web page and a content of said web page;
        automatically generate a document feature vector based on the URL or the content of the web page, the document feature vector comprising elements comprising a plurality of words or phrases that are contained in the URL or content of the web page;
        compare the key term feature vector and the document feature vector;
        generate a relevance factor based on the similarity of the elements of the key term feature vector and the document feature vector; and
        provide a relevant advertisement for display by said web browser with said web page according to the determined relevance factor.

2. The system of claim 1, wherein said at least one server is configured to provide a plurality of advertisements.

3. The system of claim 1, wherein the at least one server is configured to provide the advertisement for display within the web page.

4. The system of claim 1, wherein the at least one server is configured to provide the advertisement for display on top of the web page.

5. The system of claim 1, wherein the at least one server is configured to provide the advertisement for display under the web page.

6. The system of claim 1, wherein the at least one server is configured to:
    receive said URL for said web page from said web browser; and parse at least one of said URL and said content of said web page to generate said document feature vector of said URL or of said content of said web page.

7. The system of claim 6, wherein the at least one server is configured to generate said document feature vector of said URL or of said content of said web page in real time in response to said receipt of said URL from said web browser.

8. The system of claim 6, wherein the at least one server is configured to:
generate said document feature vector of said URL or of said content of said web page prior to said receipt of said URL from said web browser;
store said document feature vector of said URL or said content of said content of said web page in a database; and
retrieve the document feature vector from said database in real time in response to said receipt of said URL from said web browser.

9. The system of claim 8, further comprising a module that monitors the web page on an ongoing basis to alert when at least one of the web page structure, URL structure, and content on the web page has changed.

10. The system of claim 6, wherein said at least one server is configured to generate said document feature vector of said content of said web page by accessing said web page and determining a frequency of words or phrases in said content of said web page.

11. The system of claim 6, wherein said at least one server is configured to generate said document feature vector of said content of said web page by accessing said web page and using machine learning to extract information from said content of said web page.

12. The system of claim 6, wherein said document feature vector of said URL or of said content of said web page is a weighted feature vector.

13. The system of claim 1, wherein the at least one server is configured to:
receive a plurality of documents from said web browser; and
parse the plurality of documents to generate the key term feature vector of the plurality of documents.

14. The system of claim 13, wherein said at least one server is configured to generate the key term feature vector of the plurality of documents by accessing the plurality of documents and determining a frequency of words or phrases in the contents of the plurality of documents.

15. The system of claim 13, wherein said at least one server is configured to generate the key term feature vector of the plurality of documents by accessing the plurality of documents and using machine learning to extract information from the content of the plurality of documents.

16. The system of claim 13, wherein the key term feature vector of the plurality of documents is a weighted feature vector.

17. A method for selecting advertising for display with a web page requested by a user comprising:
receiving, as input, a plurality of documents and a plurality of key terms;
analyzing content of the plurality of documents;
automatically generating a key term feature vector for each key term based on the content of the plurality of documents, each key term feature vector comprising elements comprising a plurality of words or phrases that are related to the corresponding key term;
analyzing at least one of a Universal Resource Locator ("URL") of said web page and a content of said web page;
automatically generating a document feature vector based on the URL or the content of the web page, the document feature vector comprising elements comprising a plurality of words or phrases that are contained in the URL or content of the web page;
comparing the key term feature vector and the document feature vector;
generating a relevance factor based on the similarity of the elements of the key term feature vector and the document feature vector; and
providing a relevant advertisement for display by said web browser with said web page according to the determined relevance factor.

18. The method of claim 17, further providing a plurality of advertisements.

19. The method of claim 17, wherein said providing an advertisement for display comprises providing the advertisement for display within the web page.

20. The method of claim 17, wherein said providing an advertisement for display comprises providing the advertisement for display on top of the web page.

21. The method of claim 17, wherein said providing an advertisement for display comprises providing the advertisement for display under the web page.

22. The method of claim 17, further comprising:
receiving said URL for said web page;
parsing at least one of said URL and said content of said web page; and
based on said parsing, generating said document feature vector of said URL or of said content of said web page.

23. The method of claim 22, wherein said generating said document feature vector comprises generating said document feature vector of said URL or of said content of said web page in real time in response to said receiving said URL for said web page.

24. The method of claim 22, wherein said generating said document feature vector comprises generating said document feature vector of said URL or of said content of said web page prior to said receiving said URL for said web page, wherein said method further comprises:
storing said document feature vector of said URL or of said content of said web page and
retrieving the document feature vector from said database in real time in response to said receiving said URL for said web page.

25. The method of claim 24, further comprising monitoring said web page on an ongoing basis to alert when at least one of the web page structure, URL structure, and said content of said web page has changed.

26. The method of claim 22, wherein said generating said document feature vector comprises generating said document feature vector of said content of said web page by accessing said web page and determining a frequency of words or phrases in said content of said web page.

27. The method of claim 22, wherein said generating said document feature vector comprising generating said document feature vector of said content of said web page by accessing said web page and using machine learning to extract information from said content of said web page.

28. The method of claim 22, wherein said generating said document feature vector comprises generating a weighted feature vector.

29. The method of claim 17, further comprising:
receiving a plurality of documents from said web browser; and
parsing the plurality of documents to generate the key term feature vector of the plurality of documents.

30. The method of claim 29, further comprising generating the key term feature vector of the plurality of documents by accessing the plurality of documents and determining a frequency of words or phrases in the contents of the plurality of documents.

31. The method of claim 29, further comprising generating the key term feature vector of the plurality of documents by accessing the plurality of documents and using machine learning to extract information from the content of the plurality of documents.

32. The method of claim 29, wherein the key term feature vector of the plurality of documents is a weighted feature vector.

\* \* \* \* \*